(12) United States Patent
Lee

(10) Patent No.: US 12,272,807 B2
(45) Date of Patent: Apr. 8, 2025

(54) COMPOSITE PANEL FOR BATTERY PACK AND BATTERY PACK COMPRISING SAME

(71) Applicant: AMOGREENTECH CO., LTD., Gimpo-si (KR)

(72) Inventor: Hwan Ku Lee, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 489 days.

(21) Appl. No.: 17/786,869

(22) PCT Filed: Dec. 3, 2020

(86) PCT No.: PCT/KR2020/017518
§ 371 (c)(1),
(2) Date: Jun. 17, 2022

(87) PCT Pub. No.: WO2021/125637
PCT Pub. Date: Jun. 24, 2021

(65) Prior Publication Data
US 2023/0023598 A1 Jan. 26, 2023

(30) Foreign Application Priority Data
Dec. 20, 2019 (KR) .......... 10-2019-0171914

(51) Int. Cl.
*H01M 10/653* (2014.01)
*H01M 10/42* (2006.01)
(Continued)

(52) U.S. Cl.
CPC ....... *H01M 10/653* (2015.04); *H01M 10/425* (2013.01); *H01M 10/486* (2013.01);
(Continued)

(58) Field of Classification Search
CPC ............ H01M 10/653; H01M 10/425; H01M 10/486; H01M 10/6554; H01M 10/657;
(Continued)

(56) References Cited

U.S. PATENT DOCUMENTS 9,347,714 B2 5/2016 Yue et al.
9,748,618 B2 8/2017 Yue et al.
(Continued)

FOREIGN PATENT DOCUMENTS

AT 520411 A1 * 3/2019 ............ H01M 10/48
CN 208690436 U * 4/2019 ............ Y02E 60/10
(Continued)

OTHER PUBLICATIONS

Request for the Submission of an Opinion issued in KR10-2019-0171914 dated Jan. 10, 2023, 17 pgs.
(Continued)

*Primary Examiner* — Kaity V Chandler
(74) *Attorney, Agent, or Firm* — ROTHWELL, FIGG, ERNST & MANBECK, P.C.

(57) ABSTRACT

A composite panel for a battery pack including a composite panel for a battery pack provided on at least one side of a battery cell, and implemented by comprising: a heat dissipation sheet part; a heating sheet part including a heating
(Continued)

circuit pattern formed in a predetermined area; and a sensor unit for detecting any one or more of external temperature and swelling of the battery cell. According to this, the composite panel for the battery pack and the battery pack comprising same can simultaneously express the effects of detecting the temperature and swelling of the battery cell by including the sensor unit, and very easily controlling the temperature of the battery cell by having excellent heat dissipation characteristics by including the heat dissipation sheet part, and predetermined heat generation due to the heating sheet part.

10 Claims, 3 Drawing Sheets

(51) Int. Cl.
  *H01M 10/48* (2006.01)
  *H01M 10/6554* (2014.01)
  *H01M 10/657* (2014.01)
  *H01M 50/24* (2021.01)

(52) U.S. Cl.
  CPC ..... *H01M 10/6554* (2015.04); *H01M 10/657* (2015.04); *H01M 50/24* (2021.01)

(58) Field of Classification Search
  CPC .... H01M 50/24; H01M 10/482; H01M 10/63; H01M 2010/4271; H01M 2220/20; H01M 10/613; H01M 10/625; H01M 10/48; H01M 10/647; H01M 10/6555; H01M 10/6556; H01M 10/6571; H01M 10/658; H01M 50/20; H01M 50/204; H01M 50/224; H01M 50/242; Y02E 60/10
  See application file for complete search history.

(56) References Cited

U.S. PATENT DOCUMENTS

| | | | |
|---|---|---|---|
| 9,913,546 B2 * | 3/2018 | Chandler | ............. A47C 21/048 |
| 2012/0034502 A1 * | 2/2012 | Nieh | ......................... H02J 7/00 |
| | | | 429/62 |
| 2013/0252040 A1 | 9/2013 | Kwak et al. | |
| 2013/0266837 A1 | 10/2013 | Lee et al. | |
| 2013/0330577 A1 * | 12/2013 | Kristofek | ............ H01M 10/441 |
| | | | 429/61 |
| 2017/0301896 A1 * | 10/2017 | Tajima | ................... H01M 50/55 |
| 2018/0168065 A1 * | 6/2018 | Thiel | ...................... H01M 50/16 |
| 2019/0056147 A1 * | 2/2019 | Brisebois | ................ F24S 20/64 |
| 2019/0077276 A1 * | 3/2019 | Capati | ................ H05K 7/20872 |
| 2020/0076016 A1 * | 3/2020 | Riemer | ............... H01M 50/105 |

FOREIGN PATENT DOCUMENTS

| | | | | | |
|---|---|---|---|---|---|
| CN | 209344132 U | * | 9/2019 | ............ | Y02E 60/10 |
| CN | 111916868 A | * | 11/2020 | ............ | Y02E 60/10 |
| JP | 2001057240 A | * | 2/2001 | ............ | Y02E 60/10 |
| JP | 2010108699 A | * | 5/2010 | ............ | Y02E 60/10 |
| JP | 2011249015 A | * | 12/2011 | ............ | Y02E 60/10 |
| JP | 2017204358 A | | 11/2017 | | |
| KR | 100835743 B1 | | 6/2008 | | |
| KR | 10-2012-0053476 A | | 5/2012 | | |
| KR | 10-2013-0107653 A | | 10/2013 | | |
| KR | 10-2013-0112605 A | | 10/2013 | | |
| KR | 10-2014-0082032 A | | 7/2014 | | |
| KR | 101550488 B1 | * | 9/2015 | ............ | Y02E 60/10 |
| KR | 10-2019-0080094 A | | 7/2019 | | |

OTHER PUBLICATIONS

International Search Report issued in PCT/KR2020/017518 dated Mar. 29, 2021, 2 pages.

* cited by examiner

COMPOSITE PANEL FOR BATTERY PACK AND BATTERY PACK COMPRISING SAME

CROSS REFERENCE TO RELATED APPLICATION

This application is a 35 U.S.C. 371 National Phase Entry Application from PCT/KR2020/017518 filed Dec. 3, 2020, which claims priority to and the benefit of Korean Patent Application No. 10-2019-0171914, filed on Dec. 20, 2019, the disclosures of which are incorporated herein by reference in their entirety.

TECHNICAL FIELD

The present invention relates to a composite panel for a battery pack, and more particularly, to a composite panel for a battery pack and a battery pack comprising the same.

BACKGROUND

Recently, with the rapid development of industries such as electronics and communication, lithium-ion batteries with high output have been widely used, and the use of lithium-ion batteries is expanding not only in portable electronic devices such as mobile phones and laptop computers, but also in medium- and large-sized devices such as electric tools, electric bicycles, automobiles, and the like, which require high output and high power.

Accordingly, in order to apply the lithium-ion batteries to the medium- and large-sized devices, a large-capacity battery module has been implemented by connecting a plurality of battery cells in series or in parallel.

Meanwhile, when the temperature of the lithium-ion battery is increased, the overall performance of a battery may be degraded, such as a charge amount being reduced or a negative electrode reacting with an electrolyte, and when the temperature of the lithium-ion battery is reduced, the overall performance of the battery may be degraded, such as a battery lifespan being shortened or a charging rate being reduced, and thus it is preferable that a uniform temperature is maintained.

Further, in lithium-based batteries, swelling occurs due to charging and disappears due to discharging, but when the charging and discharging are repeated, a swelling phenomenon occurs in which the swelling does not fundamentally disappear and the battery swells, and when a swelling level is severe, a product is determined as defective.

Accordingly, there is an urgent need to develop a battery management system that may detect the temperature and swelling of a battery, have excellent heat dissipation characteristics, and simultaneously exhibit an effect of very easily controlling the temperature as predetermined heat generation is possible.

SUMMARY OF THE INVENTION

The present invention has been devised in consideration of the above points and is directed to providing a composite panel for a battery pack capable of detecting the temperature and swelling of a battery cell.

The present invention is also directed to providing a composite panel for a battery pack and a battery pack comprising the same, capable of having excellent heat dissipation characteristics, and simultaneously, exhibiting an effect of very easily controlling the temperature of a battery cell as predetermined heat generation is possible.

One aspect of the present invention provides a composite panel for a battery pack, which is provided on at least one surface of a battery cell, including a heat dissipation sheet part, a heating sheet part including a heating circuit pattern formed in a predetermined area thereof, and a sensor part configured to detect one or more of external temperature and swelling of a battery cell.

According to one embodiment of the present invention, the heat dissipation sheet part may include a first heat dissipation sheet part and a second heat dissipation sheet part, and the heating sheet part and the sensor part may be included between the first heat dissipation sheet part and the second heat dissipation sheet part.

Furthermore, the heating sheet part may include a heating circuit pattern formed on one surface or both surfaces thereof to be in contact with at least one of the first heat dissipation sheet part and the second heat dissipation sheet part.

Furthermore, the sensor part may include one or more of a pressure sensor and a temperature sensor.

Furthermore, the sensor part may be provided adjacent to the heating sheet part.

Furthermore, the heating sheet part may include an accommodation part for accommodating a portion or all of the sensor part, and the sensor part may be partially or entirely accommodated in the accommodation part.

Furthermore, the heat dissipation sheet part may include one or more selected from the group consisting of heat dissipation plastic, a carbon-based sheet, a metal-based sheet, and a ceramic sheet.

Furthermore, the carbon-based sheet may include a graphite sheet.

Furthermore, the heat dissipation plastic may be formed to include a polymer resin and a heat dissipation filler.

Furthermore, the composite panel may further include an insulating part disposed on an outer surface of the heat dissipation sheet part.

Another aspect of the present invention provides a battery pack including a battery cell and the above-described composite panel for a battery pack, which is provided on at least one surface of the battery cell.

According to the present invention, a composite panel for a battery pack and a battery pack comprising the same can detect the temperature and swelling of a battery cell by including a sensor part, have excellent heat dissipation characteristics by including a heat dissipation sheet part, and simultaneously exhibit an effect of easily controlling the temperature of the battery cell as predetermined heat generation is possible due to a heating sheet part.

DETAILED DESCRIPTION

Figure 1:
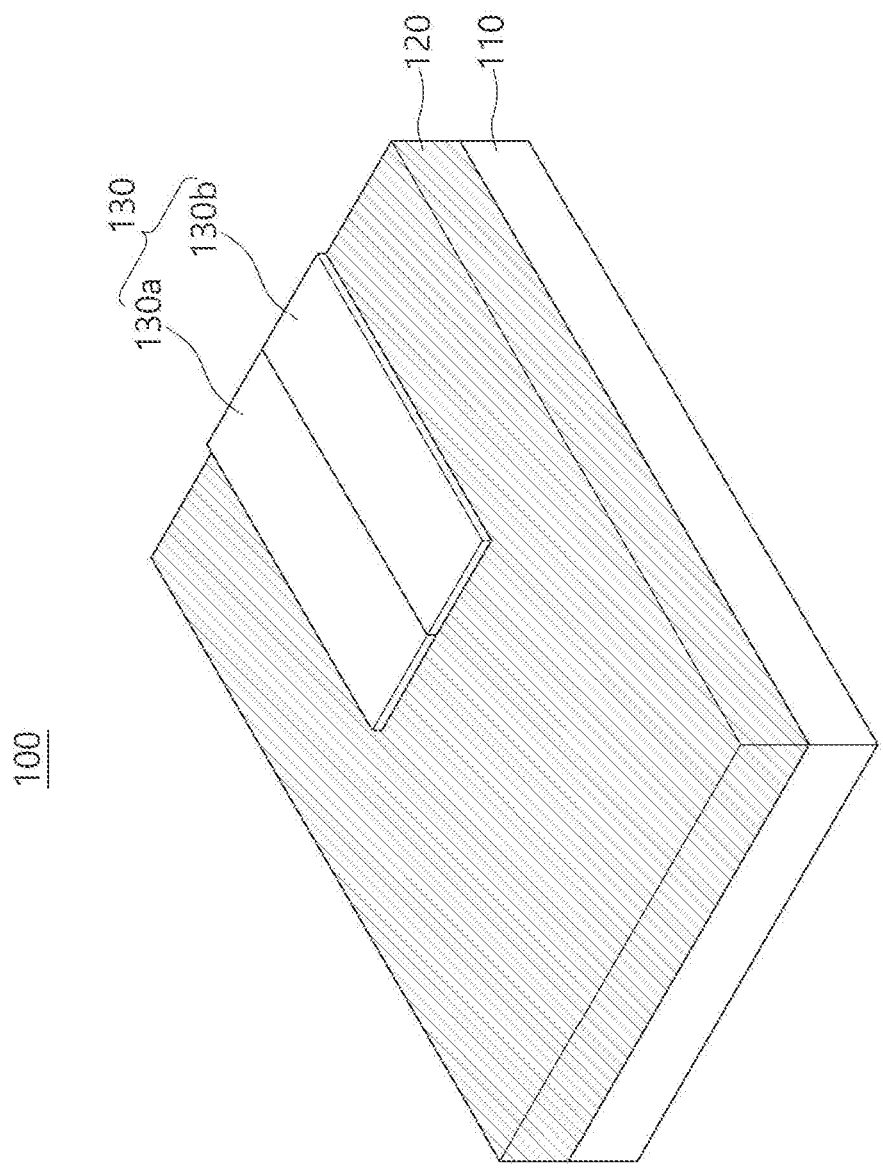
FIG. 1 is a schematic view of a composite panel for a battery pack according to one embodiment of the present invention.

Hereinafter, embodiments of the present invention will be described in detail with reference to the accompanying drawings so that those skilled in the art to which the present invention pertains may easily implement the present invention. The present invention may be implemented in various different forms and is not limited to the embodiments described herein. In the drawings, parts irrelevant to the description are omitted in order to clearly describe the present invention, and the same reference numerals are assigned to the same or similar components throughout the specification.

As shown in FIG. 1, a composite panel 100 for a battery pack according to the present invention is a composite panel for a battery pack provided on at least one surface of a battery cell, and implemented by including a heat dissipation sheet part 110, a heating sheet part 120 including a heating circuit pattern formed in a predetermined area thereof, and a sensor part 130 configured to detect at least one of external temperature and swelling of the battery cell.

First, the heat dissipation sheet part 110 will be described.

The heat dissipation sheet part 110 is provided in the composite panel 100 for a battery pack and performs a function of controlling the temperature of the battery cell.

The heat dissipation sheet part 110 may include any material without limitation as long as it is a material capable of performing a function of controlling the temperature of the above-described battery cell, but may include one or more materials selected from the group consisting of heat dissipation plastic, a carbon-based sheet, a metal-based sheet, and a ceramic sheet.

When the heat dissipation sheet part is formed of heat dissipation plastic, the heat dissipation plastic may include a polymer resin and a heat dissipation filler.

The polymer resin may be used without limitation as long as it supports the heat dissipation filler and has little change in physical properties due to heat generation, and may be a compound selected from the group consisting of polyamide, polyester, polyketone, a liquid crystal polymer, polyolefin, polyphenylene sulfide (PPS), polyether ether ketone (PEEK), polyphenylene oxide (PPO), polyethersulfone (PES), polyetherimide (PEI), and polyimide or a mixture or copolymer of at least two among the above group. The polyamide may be a known polyamide-based compound such as nylon 6, nylon 66, nylon 11, nylon 610, nylon 12, nylon 46, nylon 9T (PA-9T), Qiana, aramid, or the like.

As one example, the polyester may be a known polyester-based compound such as polyethylene terephthalate (PET), polytrimethylene terephthalate (PTT), polybutylene terephthalate (PBT), polycarbonate, or the like.

As another example, the polyolefin may be a known polyolefin-based compound such as polyethylene, polypropylene, polystyrene, polyisobutylene, ethylene vinyl alcohol, or the like.

The liquid crystal polymer may be used without limitation in the case of a polymer exhibiting liquid crystallinity in a solution or dissolved state, and may be a known type, and thus, the present invention is not particularly limited thereto.

Furthermore, the heat dissipation filler may be used without limitation as long as it is a heat dissipation filler that may be commonly used in the art, and may include one or more selected from the group consisting of one or more metals selected from the group consisting of aluminum, silver, copper, nickel, gold, and iron, one or more ceramic materials selected from the group consisting of silicon carbide, magnesium oxide, titanium dioxide, silicon dioxide, aluminum nitride, silicon nitride, boron nitride, aluminum oxide, zinc oxide, barium titanate, strontium titanate, beryllium oxide, and manganese oxide, and one or more carbon materials selected from the group consisting of graphite, graphene, carbon nanotubes, fullerene, and carbon black.

Meanwhile, when the heat dissipation sheet part includes a carbon-based sheet, the carbon-based sheet may be used without limitation as long as it is a carbon-based sheet that may be commonly used in the art, and may include a graphite sheet.

Further, when the heat dissipation sheet part includes a metal-based sheet, the metal-based sheet may be used without limitation as long as it is a metal-based sheet that may be commonly used in the art, and may include one or more selected from the group consisting of Ti, Sn, Au, Pt, Pd, Ni, Cu, Ag, Al, Zn, and Fe, but the present invention is not limited thereto.

In addition, when the heat dissipation sheet part includes a ceramic sheet, the ceramic sheet may be used without limitation as long as it is a ceramic sheet made of a material that may be commonly used in the art, and may include one or more selected from the group consisting of silicon carbide, magnesium oxide, titanium dioxide, silicon dioxide, aluminum nitride, silicon nitride, boron nitride, aluminum oxide, zinc oxide, barium titanate, strontium titanate, beryllium oxide, and manganese oxide, but the present invention is not limited thereto.

Meanwhile, according to one embodiment of the present invention, the heat dissipation sheet part 110 may further include an insulating part on an outer surface thereof. In this case, the insulating part may be an insulating part formed through an insulating method that may be commonly used in the art, and thus the present invention is not particularly limited thereto.

The insulating part may be formed only on a surface of outer surfaces of the heat dissipation sheet part 110, which is in contact with a battery cell 200 and/or a heating sheet part 120 or 121, which will be described below, or may be formed on the entire outer surfaces.

Figure 2:
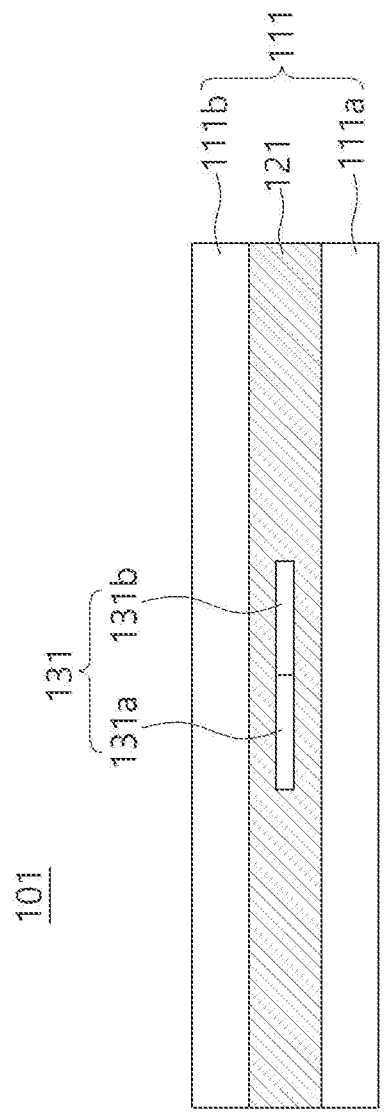
FIG. 2 is a cross-sectional schematic view of a composite panel for a battery pack according to another embodiment of the present invention.

Meanwhile, as shown in FIG. 2, a heat dissipation sheet part 111 may include a first heat dissipation sheet part 111a and a second heat dissipation sheet part 111b, and may include the heating sheet part 121 and a sensor part 131, which will be described below, between the first heat dissipation sheet part 111a and the second heat dissipation sheet part 111b.

Next, the heating sheet parts 120 and 121 will be described.

The heating sheet parts 120 and 121 may each include a heating circuit pattern formed in a predetermined area on a support member, and accordingly, may perform a function of preventing a battery temperature from being lowered.

Here, the support member may have a film shape or a web shape, and may have the film shape to prevent a decrease in thermal conductivity due to pores.

When the support member has a film shape, the support member may include any material that may be commonly used in the art without limitation, and thus the present invention is not particularly limited thereto.

Further, when the support member has a web shape, the support member may include any material that may be commonly used in the art without limitation, and may include one or more compounds selected from the group consisting of polyurethane, polystyrene, polyvinylalchol, polymethyl methacrylate, polylactic acid, polyethylene oxide, polyvinyl acetate, polyacrylic acid, polycaprolactone, polyacrylonitrile, polyvinylpyrrolidone, polyvinyl chloride, polycarbonate, polyetherimide, polyesthersulphone, polybenzimidazol, polyethylene terephthalate, polybutylene terephthalate, and a fluorine-based compound, but the present invention is not limited thereto.

The heating circuit pattern may be formed through a method that may be commonly used in the art, and may be preferably formed through printing, plating, deposition, and the like, but the present invention is not limited thereto. In addition, the heating circuit pattern may be formed using a material that may be commonly used in the art and may include one or more metals selected from the group consisting of Ti, Sn, Au, Pt, Pd, Ni, Cu, Ag, Al, Zn, and Fe, but the present invention is not limited thereto.

Meanwhile, the heating sheet part 121 may include a heating circuit pattern on one surface or both surfaces thereof to be in contact with at least one of the first heat dissipation sheet part 111a and the second heat dissipation sheet part 111b, and the heating sheet part 121 may include the heating circuit pattern on both surfaces thereof so that the temperature of the battery cell is easily controlled.

Further, the heating sheet part 121 may include an accommodation part for accommodating a portion or all of the sensor part 131 to be described below.

Next, the sensor parts 130 and 131 will be described.

The sensor parts 130 and 131 may each include one or more of pressure sensors 130a and 131a and temperature sensors 130b and 131b, and it may be more advantageous for the sensor parts 130 and 131 to each include both the pressure sensors 130a and 131a and the temperature sensors 130b and 131b in terms of detecting swelling and temperature of the battery cell.

Further, the pressure sensors 130a and 131a and the temperature sensors 130b and 131b each provided in the sensor parts 130 and 131 may be disposed to be in contact with each other as shown in FIGS. 1 and 2 or may be disposed to have a predetermined separation distance therebetween, but the present invention is not limited thereto.

Meanwhile, as shown in FIG. 1, the sensor part 130 may be provided adjacent to the heating sheet part 120, and the sensor part 131 may be partially accommodated in the above-described accommodation part of the heating sheet part 121, or as shown in FIG. 2, the sensor part 131 may be entirely accommodated in the above-described accommodation part of the heating sheet part 121. Accordingly, the degree of protrusion of the sensor part 131 to be described below is lowered so that a step difference may be significantly reduced, a step difference may not be generated on the composite panel as the sensor part 131 does not protrude, and accuracy in a function of detecting the swelling and temperature of the battery cell may be improved. In particular, when a composite panel 101 for a battery pack according to the present invention is disposed between a battery cell and another battery cell adjacent to the battery cell, even when swelling and temperature drop occur in any battery cell among adjacent battery cells, it is possible to exhibit an effect of detecting the swelling and temperature drop.

Figure 3:
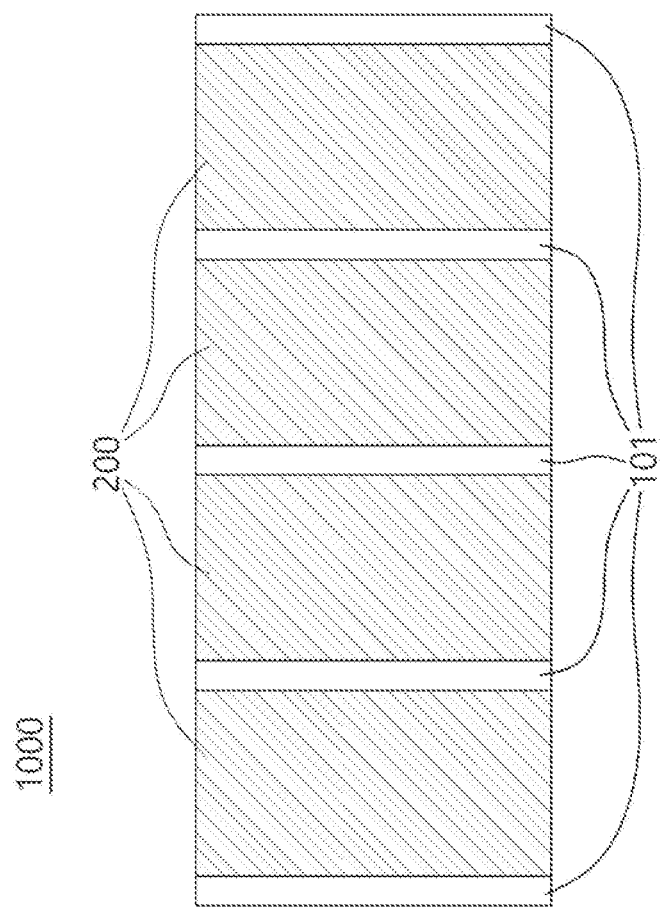
FIG. 3 is a cross-sectional schematic view of a battery pack according to one embodiment of the present invention.

Meanwhile, as shown in FIG. 3, the present invention provides a battery pack 1000 including a battery cell 200 and the above-described composite panel 101 for a battery pack provided on at least one surface of the battery cell 200.

As the above-described composite panel 101 for a battery pack is provided on at least one surface of the battery cell 200, and preferably, on one surface and the other surface facing the one surface of the battery cell 200, swelling and temperature of the battery cell can be detected, and as heat dissipation characteristics are excellent and predetermined heat generation is possible, an effect of easily controlling the temperature of the battery cell can be simultaneously exhibited.

Further, according to another embodiment of the present invention, there is provided a battery pack control system including the battery pack and a control part electrically connected to the battery pack and configured to perform temperature control and detect swelling according to the detected temperature.

Here, the battery pack control system may further include a cable electrically connecting the battery pack and the control part, and the cable may be used without limitation as long as it is a cable that may be commonly used in the art, and thus the present invention is not particularly limited thereto.

Further, the battery pack control system may further include a cooling part that is disposed below the battery pack and may perform a function of lowering the temperature of the battery pack. The cooling part may be used without limitation as long as it is a cooling part that may be commonly used in the art, and thus the present invention is not particularly limited thereto.

The embodiments of the present invention have been described above. However, it should be noted that the spirit of the present invention is not limited to the embodiments in the specification and those skilled in the art and understanding the present invention may easily suggest other embodiments by addition, modification, and removal of the components within the same spirit, but those are construed as being included in the spirit of the present invention.

The invention claimed is:

1. A composite panel for a battery pack, which is provided on at least one surface of a battery cell, the composite panel comprising:
    a heat dissipation sheet part;
    a heating sheet part including a heating circuit pattern formed in a predetermined area thereof; and
    a sensor part configured to detect one or more of external temperature and swelling of a battery cell; and wherein the heat dissipation sheet part includes a first heat dissipation sheet part and a second heat dissipation sheet part, and the heating sheet part and the sensor part are included between the first heat dissipation sheet part and the second heat dissipation sheet part.

2. The composite panel of claim 1, wherein the heating sheet part includes a heating circuit pattern formed on one surface or both surfaces thereof to be in contact with at least one of the first heat dissipation sheet part and the second heat dissipation sheet part.

3. The composite panel of claim 1, wherein the sensor part includes one or more of a pressure sensor and a temperature sensor.

4. The composite panel of claim 1, wherein the sensor part is provided adjacent to the heating sheet part.

5. The composite panel of claim 1, wherein the heating sheet part includes an accommodation part for accommodating a portion or all of the sensor part, and
    the sensor part is partially or entirely accommodated in the accommodation part.

6. The composite panel of claim 1, wherein the heat dissipation sheet part includes one or more selected from the group consisting of heat dissipation plastic, a carbon-based sheet, a metal-based sheet, and a ceramic sheet.

7. The composite panel of claim 6, wherein the carbon-based sheet includes a graphite sheet.

8. The composite panel of claim 6, wherein the heat dissipation plastic is formed to include a polymer resin and a heat dissipation filler.

9. The composite panel of claim 1, further comprising an insulating part disposed on an outer surface of the heat dissipation sheet part.

10. A battery pack comprising:
a battery cell; and
the composite panel for a battery pack of claim 1, provided on at least one surface of the battery cell.

\* \* \* \* \*